United States Patent
Tomita et al.

(10) Patent No.: US 9,620,796 B2
(45) Date of Patent: Apr. 11, 2017

(54) FUEL CELL SYSTEM AND CONTROL METHOD THEREFOR

(71) Applicant: NISSAN MOTOR CO., LTD., Yokohama-shi, Kanagawa (JP)

(72) Inventors: Yousuke Tomita, Yokohama (JP); Hayato Chikugo, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 17 days.

(21) Appl. No.: 14/778,907

(22) PCT Filed: Feb. 12, 2014

(86) PCT No.: PCT/JP2014/053216
§ 371 (c)(1),
(2) Date: Sep. 21, 2015

(87) PCT Pub. No.: WO2014/148151
PCT Pub. Date: Sep. 25, 2014

(65) Prior Publication Data
US 2016/0049671 A1 Feb. 18, 2016

(30) Foreign Application Priority Data

Mar. 22, 2013 (JP) .................................. 2013-059815
Dec. 17, 2013 (JP) .................................. 2013-260576

(51) Int. Cl.
*H01M 8/04* (2016.01)
*H01M 8/04007* (2016.01)
(Continued)

(52) U.S. Cl.
CPC ... *H01M 8/04074* (2013.01); *H01M 8/04007* (2013.01); *H01M 8/04089* (2013.01); *H01M 8/04104* (2013.01); *H01M 8/04335* (2013.01); *H01M 8/04395* (2013.01); *H01M 8/04708* (2013.01); *H01M 8/04753* (2013.01);
(Continued)

(58) Field of Classification Search
CPC ......... H01M 8/04074; H01M 8/04104; H01M 8/04335; H01M 8/04007; H01M 8/04708
See application file for complete search history.

(56) References Cited

U.S. PATENT DOCUMENTS 5,518,828 A * 5/1996 Senetar ............. H01M 8/04089
429/439
5,837,393 A * 11/1998 Okamoto .......... H01M 8/04089
429/424

(Continued)

FOREIGN PATENT DOCUMENTS

CN 1641345 A 7/2005
CN 100479249 C 4/2009
(Continued)

*Primary Examiner* — Stewart Fraser
(74) *Attorney, Agent, or Firm* — Foley & Lardner LLP (57) ABSTRACT

A fuel cell system comprises a compressor configured to supply the cathode gas to the fuel cell, an intercooler provided downstream of the compressor and configured to cool the cathode gas discharged from the compressor, a pressure regulating valve configured to adjust a pressure downstream of the intercooler, and a controller. The controller computes a first target pressure of the intercooler downstream pressure according to a target output of the fuel cell and computes a second target pressure of the intercooler downstream pressure according to the intercooler downstream temperature. Then, the controller sets smaller one of the first and second target pressures as a target pressure of the intercooler downstream pressure and controls the compressor and the pressure regulating valve according to the target pressure.

6 Claims, 6 Drawing Sheets

(51) Int. Cl.
*H01M 8/04089* (2016.01)
*H01M 8/0432* (2016.01)
*H01M 8/0438* (2016.01)
*H01M 8/04701* (2016.01)
*H01M 8/04746* (2016.01)
*H01M 8/04858* (2016.01)
*H01M 8/04537* (2016.01)
*H01M 8/04791* (2016.01)

(52) U.S. Cl.
CPC ........ *H01M 8/0438* (2013.01); *H01M 8/0491* (2013.01); *H01M 8/04358* (2013.01); *H01M 8/04559* (2013.01); *H01M 8/04589* (2013.01); *H01M 8/04798* (2013.01)

(56) References Cited

U.S. PATENT DOCUMENTS

| 2002/0022161 | A1 | 2/2002 | Kurosaki et al. | |
| 2005/0260466 | A1 | 11/2005 | Kobayashi et al. | |
| 2007/0015014 | A1 | 1/2007 | Kurosaki et al. | |
| 2013/0149624 | A1* | 6/2013 | Takada | H01M 8/04089 429/439 |
| 2014/0287334 | A1* | 9/2014 | Noh | H01M 8/2465 429/429 |
| 2016/0049672 | A1* | 2/2016 | Tomita | H01M 8/04373 429/446 |
| 2016/0285117 | A1* | 9/2016 | Tomita | H01M 8/04104 |

FOREIGN PATENT DOCUMENTS

| JP | 2001-351654 A | 12/2001 |
| JP | 2002-42839 A | 2/2002 |
| JP | 2004-139866 A | 5/2004 |
| JP | 2006-164781 A | 6/2006 |
| JP | 2006-196192 A | 7/2006 |
| JP | 2010-270725 A | 12/2010 |
| JP | 2011-48989 A | 3/2011 |

* cited by examiner

FUEL CELL SYSTEM AND CONTROL METHOD THEREFOR

TECHNICAL FIELD

The present invention relates to a fuel cell system and a control method therefor.

BACKGROUND ART

JP2010-270725A describes a system including an intercooler for cooling cathode gas discharged from a cathode compressor and an intercooler fan for blowing cooling air to the intercooler, as a conventional fuel cell system.

SUMMARY OF INVENTION

A fuel cell system including an intercooler fan like the aforementioned conventional fuel cell system can protect components downstream of the intercooler against heat by controlling a heat radiation amount of the intercooler with the intercooler fan.

However, it is considered to remove an intercooler fan for a cost reduction from fuel cell systems which are currently developed. Then, a heat radiation amount of an intercooler cannot be controlled. Thus, there is a problem of being unable to protect components downstream of the intercooler against heat.

The present invention was developed in view of such a problem and aims to protect components downstream of an intercooler against heat by a method different from the one for protecting the components downstream of the intercooler against heat by an intercooler fan.

According to one aspect of the present invention, a fuel cell system for generating power by supplying anode gas and cathode gas to a fuel cell is provided. Then, the fuel cell system is characterized by including: a compressor configured to supply the cathode gas to the fuel cell; an intercooler provided downstream of the compressor and configured to cool the cathode gas discharged from the compressor; a pressure regulating valve configured to adjust a pressure downstream of the intercooler; intercooler downstream temperature detection means configured to detect a temperature downstream of the intercooler; first target pressure computation means configured to compute a first target pressure of the intercooler downstream pressure according to a target output of the fuel cell; second target pressure computation means configured to compute a second target pressure of the intercooler downstream pressure according to the intercooler downstream temperature; target pressure setting means configured to set smaller one of the first and second target pressures as a target pressure of the intercooler downstream pressure; and pressure control means configured to control the intercooler downstream pressure to the target pressure by controlling the compressor and the pressure regulating valve according to the target pressure.

DESCRIPTION OF EMBODIMENT

Hereinafter, an embodiment of the present invention is described with reference to the accompanying drawings and the like.

In a fuel cell, an electrolyte membrane is sandwiched by an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both anode and cathode electrodes are as follows.

$$\text{Anode electrode: } 2H_2 \rightarrow 4H^+ + 4e^- \quad (1)$$

$$\text{Cathode electrode: } 4H^+ + 4e^- + O_2 \rightarrow 2H_2O \quad (2)$$

The fuel cell generates an electromotive force of about 1 volt by the above electrode reactions (1) and (2).

In the case of using a fuel cell as a power source for automotive vehicle, a fuel cell stack in which several hundreds of fuel cells are laminated is used since required power is large. By configuring a fuel cell system for supplying the anode gas and the cathode gas to the fuel cell stack, power for driving a vehicle is taken out.

Figure 1:
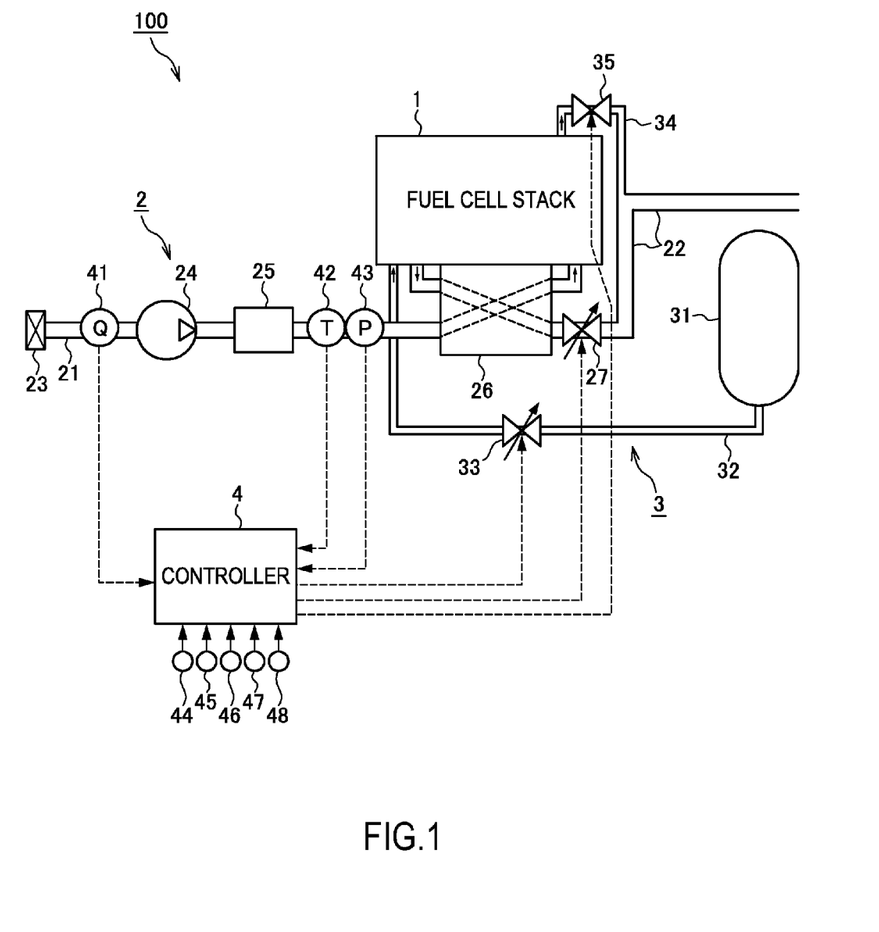
FIG. 1 is a schematic diagram of a fuel cell system according to one embodiment of the present invention.

FIG. 1 is a schematic diagram of a fuel cell system 100 according to an embodiment of the present invention.

The fuel cell system 100 includes a fuel cell stack 1, a cathode gas supplying/discharging device 2, an anode gas supplying/discharging device 3 and a controller 4.

The fuel cell stack 1 is formed by laminating several hundreds of fuel cells and generates power necessary to drive a vehicle upon receiving the supply of the anode gas and the cathode gas.

The cathode gas supplying/discharging device 2 supplies the cathode gas to the fuel cell stack 1 and discharges cathode off-gas discharged from the fuel cell stack 1 to outside air. The cathode gas supplying/discharging device 2 includes a cathode gas supply passage 21, a cathode gas discharge passage 22, a filter 23, a cathode compressor 24, an intercooler 25, a water recovery device (hereinafter, referred to as "WRD") 26, a cathode pressure regulating valve 27, an air flow sensor 41, a temperature sensor 42 and a pressure sensor 43.

The cathode gas supply passage 21 is a passage in which the cathode gas to be supplied to the fuel cell stack 1 flows. One end of the cathode gas supply passage 21 is connected to the filter 23 and the other end is connected to a cathode gas inlet hole of the fuel cell stack 1.

The cathode gas discharge passage 22 is a passage in which the cathode off-gas discharged from the fuel cell stack 1 flows. One end of the cathode gas discharge passage 22 is connected to a cathode gas outlet hole of the fuel cell stack 1 and the other end is formed as an opening end. The cathode off-gas is mixed gas of the cathode gas and steam produced by the electrode reaction.

The filter 23 removes foreign substances in the cathode gas to be taken into the cathode gas supply passage 21.

The cathode compressor 24 is provided in the cathode gas supply passage 21. The cathode compressor 24 takes air (outside air) as the cathode gas into the cathode gas supply passage 21 via the filter 23 and supplies it to the fuel cell stack 1.

The intercooler 25 is provided downstream of the cathode compressor 24 in the cathode gas supply passage 21. The intercooler 25 cools the cathode gas discharged from the cathode compressor 24.

The WRD 26 is connected to each of the cathode gas supply passage 21 and the cathode gas discharge passage 22, recovers moisture in the cathode off-gas flowing in the cathode gas discharge passage 22 and humidifies the cathode gas flowing in the cathode gas supply passage 21 by the recovered moisture.

The cathode pressure regulating valve 27 is provided downstream of the WRD 26 in the cathode gas discharge passage 22. The cathode pressure regulating valve 27 is on-off controlled by the controller 4 to adjust a pressure of the cathode gas to be supplied to the fuel cell stack 1 to a desired pressure.

The air flow sensor 41 is provided upstream of the cathode compressor 24 in the cathode gas supply passage 21. The air flow sensor 41 detects a flow rate (hereinafter, referred to as a "stack supply flow rate") of the cathode gas which is supplied to the cathode compressor 24 and is finally supplied to the fuel cell stack 1.

The temperature sensor 42 is provided between the intercooler 25 and the WRD 26 in the cathode gas supply passage 21. The temperature sensor 42 detects a temperature at a cathode gas inlet side of the WRD 26 (hereinafter, referred to as a "WRD inlet temperature").

The pressure sensor 43 is provided between the intercooler 25 and the WRD 26 in the cathode gas supply passage 21. The pressure sensor 43 detects a pressure at the cathode gas inlet side of the WRD 26 (hereinafter, referred to as a "WRD inlet pressure").

The anode gas supplying/discharging device 3 supplies the anode gas to the fuel cell stack 1 and discharges anode off-gas discharged from the fuel cell stack 1 to the cathode gas discharge passage 22. The anode gas supplying/discharging device 3 includes a high-pressure tank 31, an anode gas supply passage 32, an anode pressure regulating valve 33, an anode gas discharge passage 34 and a purge valve 35.

The high-pressure tank 31 stores the anode gas to be supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31 and the other end is connected to an anode gas inlet hole of the fuel cell stack 1.

The anode pressure regulating valve 33 is provided in the anode gas discharge passage 32. The anode pressure regulating valve 33 is on-off controlled by the controller 4 to adjust a pressure of the anode gas to be supplied to the fuel cell stack 1 to a desired pressure.

The anode gas discharge passage 34 is a passage in which the anode off-gas discharged from the fuel cell stack 1 flows. One end of the anode gas discharge passage 34 is connected to an anode gas outlet hole of the fuel cell stack 1 and the other end is connected to the cathode gas discharge passage 22. The anode off-gas is mixed gas of surplus anode gas not used in the electrode reaction, inert gas such as nitrogen leaked from a cathode side and steam.

The anode-off gas discharged to the cathode gas discharge passage 22 via the anode gas discharge passage 34 is mixed with the cathode off-gas in the cathode gas discharge passage 22 and discharged to the outside of the fuel cell system 100. Since the anode off-gas contains the surplus anode gas (hydrogen) not used in the electrode reaction, a hydrogen concentration in exhaust gas is reduced to a predetermined specific concentration or below by mixing the anode off-gas with the cathode off-gas and discharging the mixture to the outside of the fuel cell system 100.

The purge valve 35 is provided in the anode gas discharge passage 34. The purge valve 35 is on-off controlled by the controller 4 to control a flow rate of the anode off-gas discharged from the anode gas discharge passage 34 to the cathode gas discharge passage 22.

The controller 4 is configured by a microcomputer including a central processing unit (CPU), a read-only memory (ROM), a random access memory (RAM) and an input/output interface (I/O interface). The controller 4 are input signals from various sensors such as a current sensor 44 for detecting a current (output current) taken out from the fuel cell stack 1, a voltage sensor 45 for detecting an output voltage of the fuel cell stack 1, an accelerator stroke sensor 46 for detecting a depressed amount of an accelerator pedal (hereinafter, referred to as an "accelerator operation amount"), a water temperature sensor 47 for detecting a temperature of cooling water for cooling the fuel cell stack 1 (hereinafter, referred to as a "cooling water temperature") and an atmospheric pressure sensor 48 for detecting an atmospheric pressure besides the air flow sensor 41, the temperature sensor 42 and the pressure sensor 43 described above.

The controller 4 computes a target value of the current taken out from the fuel cell stack 1 (hereinafter, referred to as a "target output current") based on detection signals of these various sensors, operating states of various electrical components and the like. Specifically, the controller 4 computes the target output current based on a load applied to the fuel cell stack 1.

The controller 4 also controls the WRD inlet pressure and the stack supply flow rate to suitable target values so that an oxygen partial pressure in the fuel cell stack does not fall below a predetermined oxygen partial pressure even if the target output current is taken out from the fuel cell stack 1. This is because oxygen necessary for power generation becomes deficient to reduce an IV characteristic (current/voltage characteristic) of the fuel cell stack 1 if the oxygen partial pressure falls below the predetermined oxygen partial pressure, and an output voltage of the fuel cell stack 1 may fall below a minimum output voltage necessary to drive a drive motor and the like of the vehicle if the target output current is taken out from the fuel cell stack 1.

During a high-load operation in which the target output current of the fuel cell stack 1 is relatively high, the amount of oxygen consumption also increases. Thus, the target values of the WRD inlet pressure and the stack supply flow rate need to be increased in order to ensure the oxygen partial pressure. Therefore, if the high-load operation continues, the temperature of the cathode gas discharged from the cathode compressor 24 increases. The cathode gas discharged from the cathode compressor 24 is cooled by the intercooler 25, but a heat radiation amount of the intercooler 25 cannot be controlled unless an intercooler fan is provided. As a result, depending on cases, the cathode gas cannot be sufficiently cooled by the intercooler 25. Therefore, the cathode gas having a high temperature may flow into components downstream of the intercooler 25 such as the WRD 26 and the fuel cell stack 1 and the components downstream of the intercooler 25 may not be protected against heat.

Accordingly, in the present embodiment, the components downstream of the intercooler 25 are protected against heat by limiting the WRD inlet pressure and the stack supply flow rate according to a temperature downstream of the intercooler 25, i.e. WRD inlet temperature. If the WRD inlet pressure and the stack supply flow rate are limited, the output current of the fuel cell stack 1 is more limited to ensure the oxygen partial pressure if necessary. A control of a cathode system according to the present embodiment is described below.

Figure 2:
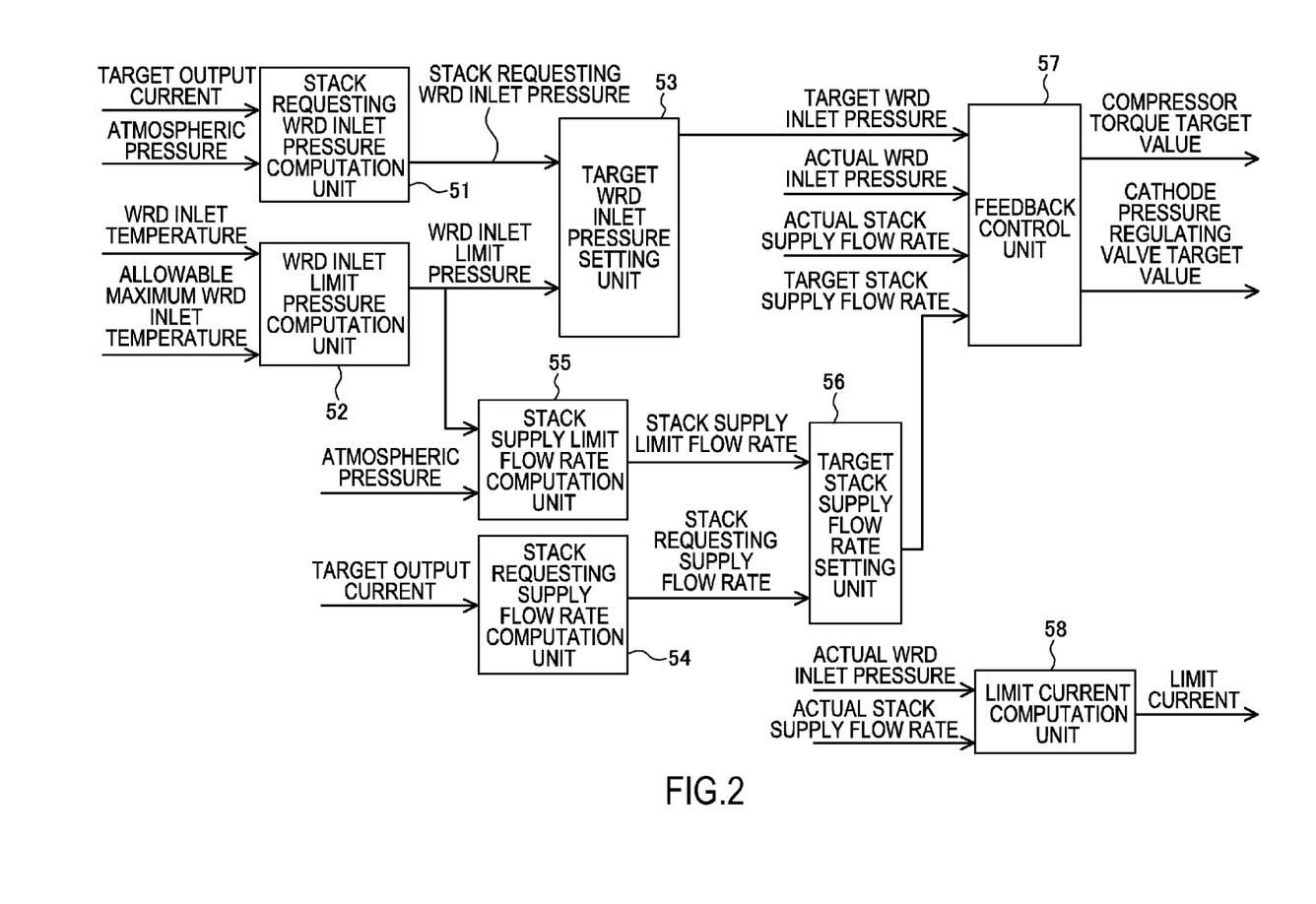
FIG. 2 is a control block diagram showing a control of a cathode system according to the one embodiment of the present invention.

FIG. 2 is a control block diagram showing the control of the cathode system according to the present embodiment.

A control block of the cathode system according to the present embodiment includes a stack requesting WRD inlet pressure computation unit 51, a WRD inlet limit pressure computation unit 52, a target WRD inlet pressure setting unit 53, a stack requesting supply flow rate computation unit 54, a stack supply limit flow rate computation unit 55, a target stack supply flow rate setting unit 56, a feedback control unit 57 and a limit current computation unit 58.

Figure 3:
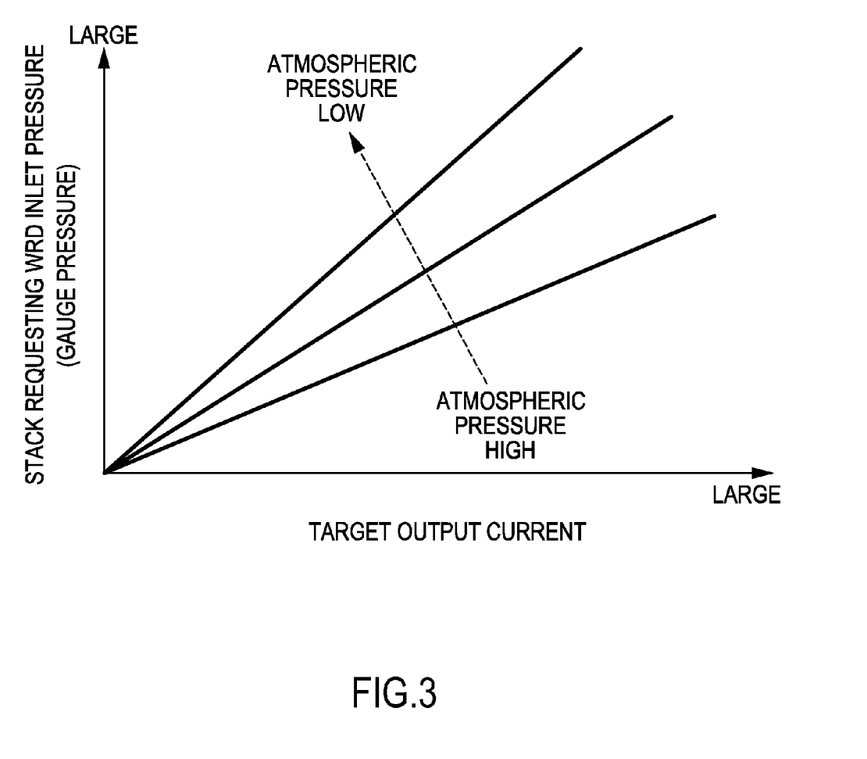
FIG. 3 is a map for computing a stack requesting WRD inlet pressure based on a target output current of a fuel cell stack and an atmospheric pressure.

The stack requesting WRD inlet pressure computation unit 51 refers to a map of FIG. 3 and computes a stack requesting WRD inlet pressure based on the target output current of the fuel cell stack 1 and the atmospheric pressure. The stack requesting WRD inlet pressure is a WRD inlet pressure necessary to ensure the oxygen partial pressure in the fuel cell stack when the target output current is taken out from the fuel cell stack 1.

The WRD inlet limit pressure computation unit 52 computes an upper limit value of the WRD inlet pressure (hereinafter, referred to as a "WRD inlet limit pressure") based on the WRD inlet temperature and a predetermined allowable maximum WRD inlet temperature. The WRD inlet limit pressure is for preventing each of the components downstream of the intercooler 25 such as the WRD 26 and the fuel cell stack 1 from reaching a temperature equal to or higher than a heat resistant temperature thereof. It should be noted that the allowable maximum WRD inlet temperature is an allowable maximum value of the WRD inlet temperature which is set in terms of protecting the components downstream of the intercooler 25 against heat. The allowable maximum WRD inlet temperature can be a value determined by an experiment or the like in advance.

The WRD inlet limit pressure computation unit 52 computes the allowable maximum WRD inlet pressure as the WRD inlet limit pressure when the WRD inlet temperature is below the allowable maximum WRD inlet temperature. The allowable maximum WRD inlet pressure is an allowable maximum value of the WRD inlet pressure which is set in terms of protecting the components downstream of the intercooler 25 against pressure. The allowable maximum WRD inlet pressure can be a value determined by an experiment or the like in advance.

On the other hand, the WRD inlet limit pressure computation unit 52 computes a pressure lower than the allowable maximum WRD inlet pressure as the WRD inlet limit pressure when the WRD inlet temperature rises to the allowable maximum WRD inlet temperature or above. Specifically, the WRD inlet limit pressure is computed based on a difference between the WRD inlet temperature and the allowable maximum WRD inlet temperature. That is, the WRD inlet limit pressure computation unit 52 computes the WRD inlet pressure, at which the WRD inlet temperature is allowed to converge to the allowable maximum WRD inlet temperature, as the WRD inlet limit pressure when the WRD inlet temperature rises to the allowable maximum WRD inlet temperature or above.

The target WRD inlet pressure setting unit 53 sets smaller one of the stack requesting WRD inlet pressure and the WRD inlet limit pressure as a target WRD inlet pressure. Since the allowable maximum WRD inlet pressure is set as the WRD inlet limit pressure when the WRD inlet temperature is below the allowable maximum WRD inlet temperature, the stack requesting WRD inlet pressure is smaller than the WRD inlet limit pressure. Thus, the target WRD inlet pressure setting unit 53 sets the stack requesting WRD inlet pressure as the target WRD inlet pressure when the WRD inlet temperature is not above the allowable maximum WRD inlet temperature.

On the other hand, when the WRD inlet temperature rises to the allowable maximum WRD inlet temperature or above, the WRD inlet limit pressure becomes smaller than the allowable maximum WRD inlet pressure. Thus, the WRD inlet limit pressure may become smaller than the stack requesting WRD inlet pressure. In such a case, the target WRD inlet pressure setting unit 53 sets the WRD inlet limit pressure as the target WRD inlet pressure.

Figure 4:
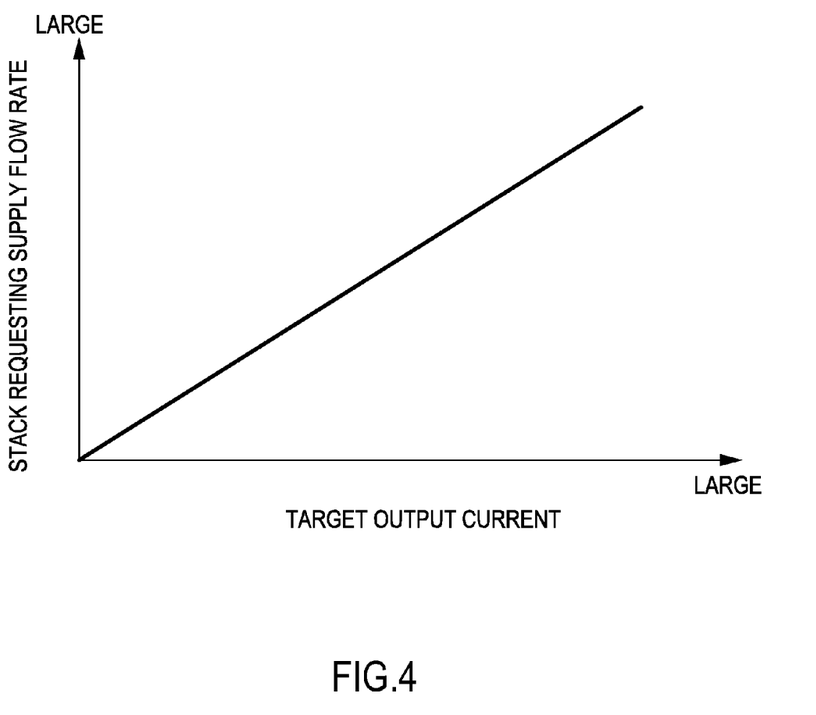
FIG. 4 is a table for computing a stack requesting supply flow rate based on the target output current of the fuel cell stack.

The stack requesting supply flow rate computation unit 54 refers to a table of FIG. 4 and computes a stack requesting supply flow rate based on the target output current of the fuel cell stack 1. The stack requesting supply flow rate is a stack supply flow rate necessary to ensure the oxygen partial pressure in the fuel cell stack when the target output current is taken out from the fuel cell stack 1.

Figure 5:
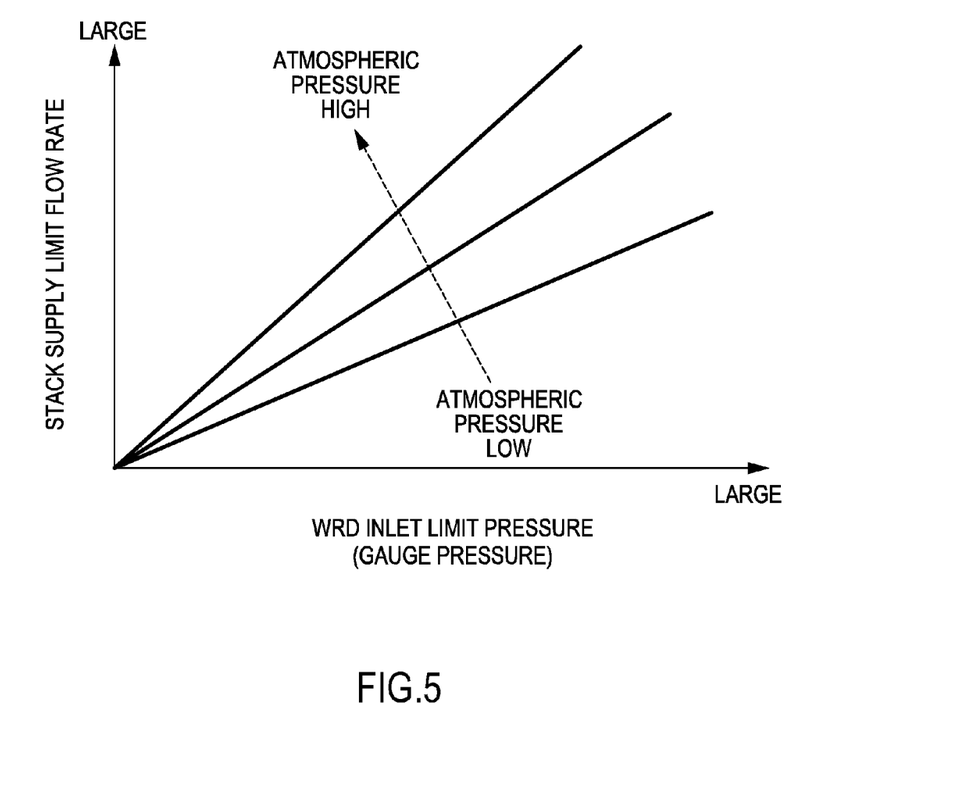
FIG. 5 is a map for computing a stack supply limit flow rate based on a WRD inlet limit pressure and the atmospheric pressure, and FIG. 6 are time charts showing a control operation of the cathode system according to the one embodiment of the present invention.

The stack supply limit flow rate computation unit 55 refers to a map of FIG. 5 and computes a stack supply limit flow rate based on the WRD inlet limit pressure and the atmospheric pressure. The stack supply limit flow rate is an upper limit value of a stack supply flow rate necessary to prevent the WRD inlet pressure from becoming larger than the WRD inlet limit pressure when the cathode pressure regulating valve 27 is fully opened.

The target stack supply flow rate setting unit 56 sets smaller one of the stack requesting supply flow rate and the stack supply limit flow rate as a target stack supply flow rate. The target stack supply flow rate setting unit 56 basically sets the stack requesting supply flow rate as the target stack supply flow rate except when the WRD inlet limit pressure is set as the target WRD inlet pressure and the cathode pressure regulating valve 27 is opened to become fully opened so as to reduce the WRD inlet pressure.

An actual WRD inlet pressure detected by the pressure sensor 43, the target WRD inlet pressure, an actual stack supply flow rate detected by the air flow sensor 41 and the target stack supply flow rate are input to the feedback control unit 57. The feedback control unit 57 computes a target value of a torque of the cathode compressor 24 and a target value of an opening of the cathode pressure regulating valve 27. The target value of a torque of the cathode compressor 24 is for converging the actual WRD inlet pressure to the target WRD inlet pressure. The target value of an opening of the cathode pressure regulating valve 27 is for converging the actual stack supply flow rate to the target stack supply flow rate.

The limit current computation unit 58 computes a maximum value (hereinafter, referred to as a "limit current") of the output current capable of ensuring the oxygen partial pressure in the fuel cell stack based on the actual WRD inlet pressure and the actual stack supply flow rate. Specifically, the limit current is a maximum value of the output current capable of ensuring the oxygen partial pressure in the fuel cell stack at the current WRD inlet pressure and stack supply flow rate.

Figure 6:
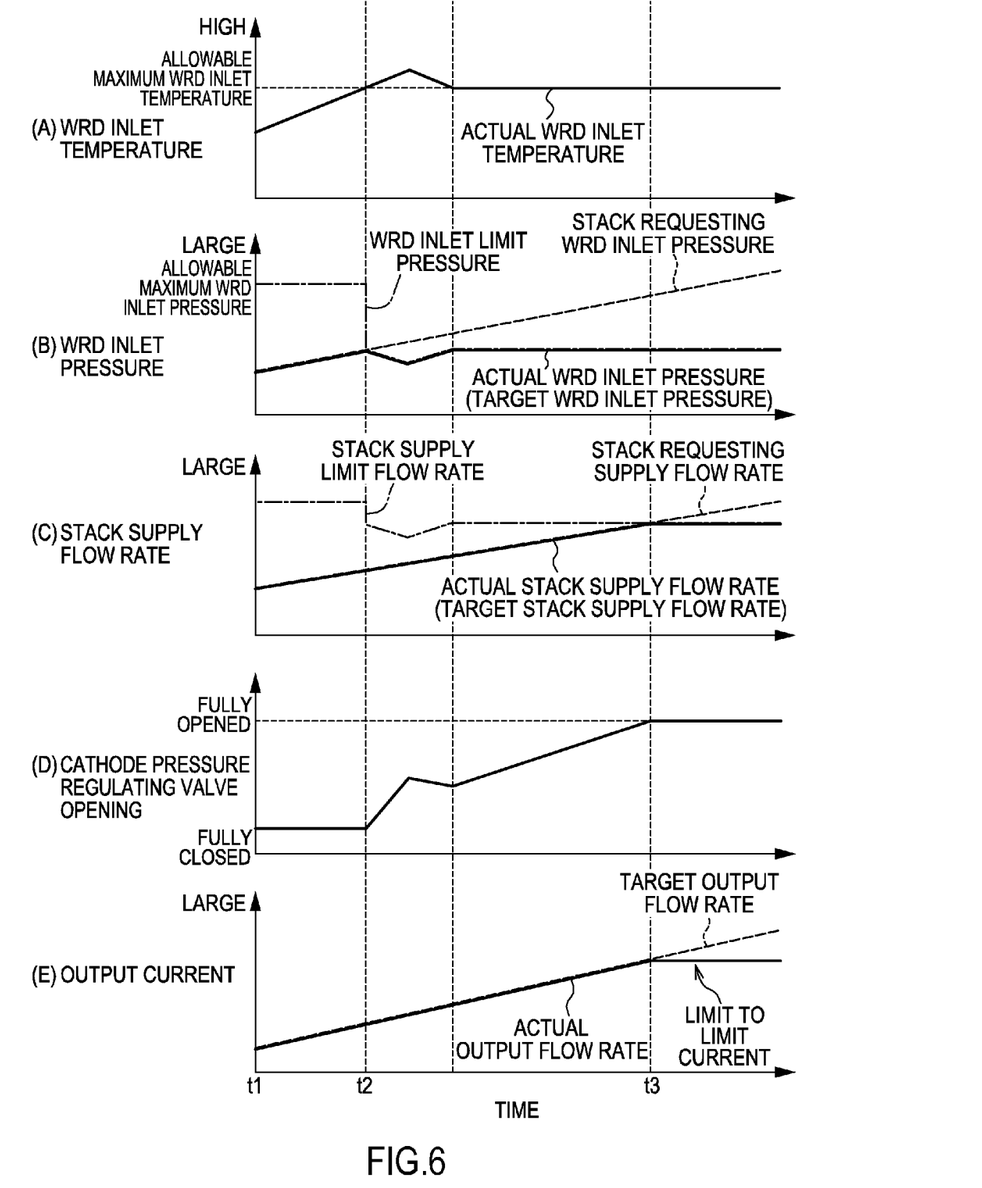

FIG. 6 are time charts showing a control operation of the cathode system according to the present embodiment.

At and after time t1, the stack requesting WRD inlet pressure and the stack requesting supply flow rate increase (FIGS. 6(B) and 6(C)) as the target output current increases (FIG. 6(E)).

Since the stack requesting WRD inlet pressure is lower than the WRD inlet limit pressure until time t2 (FIG. 6(B)), the stack requesting WRD inlet pressure is set as the target WRD inlet pressure. Since the stack requesting supply flow rate is also lower than the stack supply limit flow rate (FIG. 6(C)), the stack requesting supply flow rate is set as the target stack supply flow rate.

Thus, until time t2, the cathode compressor 24 and the cathode pressure regulating valve 27 are so controlled that the WRD inlet pressure becomes the stack requesting WRD inlet pressure and the stack supply flow rate becomes the stack requesting supply flow rate. Specifically, the WRD inlet pressure and the stack supply flow rate are increased and respectively controlled to target values (i.e. stack requesting WRD inlet pressure and stack requesting supply flow rate) by increasing the torque of the cathode compressor 24 with the cathode pressure regulating valve 27 kept fully closed.

Then, as the WRD inlet pressure and the stack supply flow rate increase, the WRD inlet temperature increases. When the WRD inlet temperature rises to the allowable maximum WRD inlet temperature at time t2 (FIG. 6(A)), the WRD inlet limit pressure corresponding to a difference between the WRD inlet temperature and the allowable maximum WRD inlet temperature is computed in the WRD inlet limit pressure computation unit 52. As a result, the WRD inlet limit pressure is lower than the stack requesting WRD inlet pressure at and after time t2. Therefore, the WRD inlet limit pressure is set as the target WRD inlet pressure and the WRD inlet pressure is limited to the WRD inlet limit pressure (FIG. 6(B)).

On the other hand, the stack supply limit flow rate also decreases as the WRD inlet limit pressure becomes lower than the allowable maximum WRD inlet pressure at time t2, but the target stack supply flow rate is maintained to be the stack supply flow rate (FIG. 6(C)) until time t3 since the stack requesting supply flow rate remains to be lower than the stack supply limit flow rate.

Thus, from time t2 to time t3, the cathode compressor 24 and the cathode pressure regulating valve 27 are so controlled that the WRD inlet pressure becomes the WRD inlet limit pressure and the stack supply flow rate becomes the stack requesting supply flow rate. Specifically, the stack supply flow rate is controlled to the stack requesting supply flow rate by increasing the torque of the cathode compressor 24 to increase the stack supply flow rate. Then, the WRD inlet pressure is controlled to the WRD inlet limit pressure by increasing the opening of the cathode pressure regulating valve 27 along with an increase of the stack supply flow rate.

Since the WRD inlet temperature can be controlled to the allowable maximum WRD inlet temperature in this way, the components downstream of the intercooler 25 can be protected against heat.

When the cathode pressure regulating valve 27 is fully opened and the stack requesting supply flow rate becomes larger than the stack supply limit flow rate at time t3, the stack supply limit flow rate is set as the target stack supply flow rate and the stack supply flow rate is limited to the stack supply limit flow rate.

Thus, at and after time t3, the cathode compressor 24 and the cathode pressure regulating valve 27 are so controlled that the WRD inlet pressure becomes the WRD inlet limit pressure and the stack supply flow rate becomes the stack supply limit flow rate. Specifically, the stack supply flow rate is limited to the stack supply limit flow rate by keeping the torque of the cathode compressor 24 constant along with the cathode pressure regulating valve 27 kept fully open.

Further, as the stack supply flow rate is limited as well as the WRD inlet pressure at time t3, the limit current capable of ensuring the oxygen partial pressure in the fuel cell stack at the current actual WRD inlet pressure and actual stack supply flow rate (i.e. WRD inlet limit pressure and stack supply limit flow rate) becomes smaller than the target output current. Thus, at and after time t3, the output current of the fuel cell stack 1 is limited to the limit current.

If the stack supply flow rate is limited as well as the WRD inlet pressure in order to protect the components downstream of the intercooler 25 against heat and the target output current increases, the oxygen partial pressure may fall below the minimum oxygen partial pressure. However, by limiting the output current according to the limited WRD inlet pressure and stack supply flow rate as in the present embodiment, it can be suppressed that the oxygen partial pressure in the fuel cell stack falls below the minimum oxygen partial.

The fuel cell system 100 according to the present embodiment described above includes the cathode compressor 24 configured to supply the cathode gas to the fuel cell stack 1, the intercooler 25 provided downstream of the cathode compressor 24 and configured to cool the cathode gas discharged from the cathode compressor 24, the cathode pressure regulating valve 27 configured to adjust the pressure downstream of the intercooler 25 (WRD inlet pressure) and the controller 4.

The controller 4 detects the temperature downstream of the intercooler 25 (WRD inlet temperature), computes a first target pressure of the intercooler downstream pressure (stack requesting WRD inlet pressure) according to the target output of the fuel cell stack 1 and computes a second target pressure of the intercooler downstream pressure (WRD inlet limit pressure) according to the intercooler downstream temperature. Then, the controller 4 sets smaller one of the first and second target pressures as the target pressure of the intercooler downstream pressure and controls the intercooler downstream pressure to the target pressure by controlling the cathode compressor 24 and the cathode pressure regulating valve 27 according to the target pressure.

In this way, the intercooler downstream pressure is limited to the second target pressure when the second target pressure set according to the intercooler downstream temperature becomes smaller than the first target pressure set according to the target output of the fuel cell stack 1. Specifically, the WRD inlet pressure is limited to the WRD inlet limit pressure when the WRD inlet limit pressure set according to the WRD inlet temperature becomes smaller than the stack requesting WRD inlet pressure set according to the target output current of the fuel cell stack 1.

By limiting the intercooler downstream pressure to the second target pressure in this way, an increase of the intercooler downstream temperature can be suppressed. Therefore, the components downstream of the intercooler can be protected against heat. Specifically, even if the WRD inlet temperature increases for a certain reason, the components downstream of the intercooler 25 can be protected against heat by suppressing such an increase.

Further, the controller 4 of the fuel cell system 100 according to the present embodiment computes a first target flow rate (stack requesting supply flow rate) of the cathode gas to be supplied to the fuel cell stack 1 based on the target output of the fuel cell stack 1 and computes a second target flow rate (stack supply limit flow rate) of the cathode gas to be supplied to the fuel cell stack 1 based on the second target pressure (WRD inlet limit pressure). Then, the controller 4 sets smaller one of the first and second target flow rates as the target flow rate of the cathode gas to be supplied to the fuel cell stack 1. The controller 4 also controls the flow rate of the cathode gas to be supplied to the fuel cell stack 1 to the target flow rate by controlling the cathode compressor 24 and the cathode pressure regulating valve 27 according to the target flow rate. At this time, the controller 4 sets the second target flow rate at a value smaller than the first target flow rate which is computed based on the target output of the fuel cell stack 1 when the cathode pressure regulating valve 27 is fully opened.

If the stack requesting supply flow rate increases as the target output current of the fuel cell stack 1 increases when the WRD inlet pressure is limited to the WRD inlet limit pressure to protect the components downstream of the intercooler 25 against heat, the cathode pressure regulating valve 27 is fully opened, and thereby the WRD inlet pressure can be no longer controlled by an opening control of the cathode pressure regulating valve 27. Therefore, the WRD inlet temperature may increase.

Accordingly, the stack supply limit flow rate is computed according to the WRD inlet limit pressure, and the stack supply flow rate is limited to the stack supply limit flow rate even if the stack requesting supply flow rate increases when the cathode pressure regulating valve 27 is fully opened.

In this way, the stack supply flow rate is further limited to the stack supply limit flow rate to suppress an increase of the WRD inlet temperature when the cathode pressure regulating valve 27 is fully opened. Thus, the components downstream of the intercooler 25 can be protected against heat.

Further, the controller 4 of the fuel cell system 100 according to the present embodiment detects the pressure downstream of the intercooler 25 (WRD inlet pressure) and detects the flow rate of the cathode gas to be supplied to the fuel cell stack 1 (stack supply flow rate). Then, the controller 4 computes an output upper limit value of the fuel cell stack 1 based on the detected intercooler downstream pressure and cathode gas flow rate.

If both the WRD inlet pressure and the stack supply flow rate are limited so as to protect the components downstream of the intercooler 25 against heat, it may not be possible to ensure the minimum oxygen partial pressure when the target output current of the fuel cell stack 1 is large.

Accordingly, in the present embodiment, the output current is limited according to the limited WRD inlet pressure and stack supply flow rate. In this way, it can be suppressed that the oxygen partial pressure in the fuel cell stack falls below the minimum oxygen partial.

Further, the fuel cell system 100 according to the present embodiment includes the cathode compressor 24 configured to supply the cathode gas to the fuel cell stack 1, the intercooler 25 provided downstream of the cathode compressor 24 and configured to cool the cathode gas discharged from the cathode compressor 24, the cathode pressure regulating valve 27 configured to adjust the pressure downstream of the intercooler 25 (WRD inlet pressure) and the controller 4.

The controller 4 detects the temperature downstream of the intercooler 25 and controls the intercooler downstream pressure by controlling the cathode compressor 24 and the cathode pressure regulating valve 27 based on the target output of the fuel cell stack 1. Then, the controller 4 limits the intercooler downstream pressure when the intercooler downstream temperature rises to a predetermined temperature or above.

Also by doing so, even if the WRD inlet temperature increases for a certain reason, the components downstream of the intercooler 25 can be protected against heat by suppressing such an increase.

Although the embodiment of the present invention has been described above, the above embodiment is merely an illustration of one application example of the present invention and not of the nature to limit the technical scope of the present invention to the specific configuration of the above embodiment.

For example, the stack supply limit flow rate may be corrected according to the temperature in the fuel cell stack. Specifically, the stack supply limit flow rate is corrected to be smaller as the cooling water temperature representing the temperature in the fuel cell stack increases. This is because a steam partial pressure in the fuel cell stack increases and the oxygen partial pressure decreases along with an increase of the temperature in the fuel cell stack. By correcting the stack supply limit flow rate to be smaller along with an increase of the cooling water temperature, the output current is limited early when the steam partial pressure in the fuel cell stack is high. Thus, it can be more reliably suppressed that the oxygen partial pressure in the fuel cell stack falls below the minimum oxygen partial.

It should be noted that a correction is desirably made according to the higher cooling water temperature if both of water temperatures at a cooling water inlet side and at a cooling water outlet side of the fuel cell stack 1 are detected.

The present application claims priorities of Japanese Patent Applications No. 2013-59815 and Japanese Patent Application No. 2013-260576 filed with the Japan Patent Office on Mar. 22, 2013 and Dec. 17, 2013 respectively, and all the contents of which are hereby incorporated by reference.

The invention claimed is:

1. A fuel cell system for generating power by supplying anode gas and cathode gas to a fuel cell, comprising:
   a compressor configured to supply the cathode gas to the fuel cell;
   an intercooler provided downstream of the compressor and configured to cool the cathode gas discharged from the compressor;
   a pressure regulating valve configured to adjust a pressure downstream of the intercooler;
   an intercooler downstream temperature detection unit configured to detect a temperature downstream of the intercooler;
   a first target pressure computation unit configured to compute a first target pressure of the intercooler downstream pressure according to a target output of the fuel cell;
   a second target pressure computation unit configured to compute a second target pressure of the intercooler downstream pressure according to the intercooler downstream temperature;
   a target pressure setting unit configured to set smaller one of the first and second target pressures as a target pressure of the intercooler downstream pressure; and a pressure control unit configured to control the intercooler downstream pressure to the target pressure by controlling the compressor and the pressure regulating valve according to the target pressure.

2. The fuel cell system according to claim 1, comprising:
a first target flow rate computation unit configured to compute a first target flow rate of the cathode gas to be supplied to the fuel cell based on the target output of the fuel cell;
a second target flow rate computation unit configured to compute a second target flow rate of the cathode gas to be supplied to the fuel cell based on the second target pressure;
a target flow rate setting unit configured to set smaller one of the first and second target flow rates as a target flow rate of the cathode gas to be supplied to the fuel cell; and
a flow rate control unit configured to control the flow rate of the cathode gas to be supplied to the fuel cell to the target flow rate by controlling the compressor and the pressure regulating valve according to the target flow rate.

3. The fuel cell system according to claim 2, wherein:
the second target flow rate is a smaller value than the first target flow rate computed by the first target flow rate computation unit when the pressure regulating valve is fully opened.

4. The fuel cell system according to claim 2, comprising:
an intercooler downstream pressure detection unit configured to detect the intercooler downstream pressure;
a flow rate detection unit configured to detect a flow rate of the cathode gas to be supplied to the fuel cell; and
an output upper limit value computation unit configured to compute an output upper limit value of the fuel cell based on the detected intercooler downstream pressure and cathode gas flow rate.

5. A fuel cell system for generating power by supplying anode gas and cathode gas to a fuel cell, comprising:
a compressor configured to supply the cathode gas to the fuel cell;
an intercooler provided downstream of the compressor and configured to cool the cathode gas discharged from the compressor;
a pressure regulating valve configured to adjust a pressure downstream of the intercooler;
an intercooler downstream temperature detection unit configured to detect a temperature downstream of the intercooler;
a pressure control unit configured to control the intercooler downstream pressure by controlling the compressor and the pressure regulating valve based on a target output of the fuel cell; and
a pressure limiting unit configured to limit the intercooler downstream pressure when the intercooler downstream temperature rises to a predetermined temperature or above.

6. A control method for a fuel cell system with:
a fuel cell to which anode gas and cathode gas are supplied;
a compressor configured to supply the cathode gas to the fuel cell;
an intercooler provided downstream of the compressor and configured to cool the cathode gas discharged from the compressor; and
a pressure regulating valve configured to adjust a pressure downstream of the intercooler, comprising:
an intercooler downstream temperature detection step of detecting a temperature downstream of the intercooler;
a first target pressure computation step of computing a first target pressure of the intercooler downstream pressure according to a target output of the fuel cell;
a second target pressure computation step of computing a second target pressure of the intercooler downstream pressure according to the intercooler downstream temperature;
a target pressure setting step of setting smaller one of the first and second target pressures as a target pressure of the intercooler downstream pressure; and
a pressure control step of controlling the intercooler downstream pressure to the target pressure by controlling the compressor and the pressure regulating valve according to the target pressure.

* * * * *